(12) United States Patent
Yamazaki et al.

(10) Patent No.: US 8,047,906 B2
(45) Date of Patent: Nov. 1, 2011

(54) GAME MACHINE, GAME CONTROL METHOD, AND INFORMATION STORAGE MEDIUM

(75) Inventors: Yukihiro Yamazaki, Tokyo (JP); Hirotaka Ishikawa, Tokyo (JP); Shinichi Kasahara, Sapporo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 964 days.

(21) Appl. No.: 11/795,287

(22) PCT Filed: Dec. 21, 2005

(86) PCT No.: PCT/JP2005/023529
§ 371 (c)(1),
(2), (4) Date: Jul. 16, 2007

(87) PCT Pub. No.: WO2006/075494
PCT Pub. Date: Jul. 20, 2006

(65) Prior Publication Data
US 2008/0146312 A1    Jun. 19, 2008

(30) Foreign Application Priority Data
Jan. 14, 2005   (JP) .................................. 2005-008331

(51) Int. Cl.
*A63F 13/00* (2006.01)
(52) U.S. Cl. .............................................. 463/7; 463/36
(58) Field of Classification Search .................. 463/7, 36
See application file for complete search history.

(56) References Cited

U.S. PATENT DOCUMENTS
6,786,821 B2 * 9/2004 Nobe et al. ...................... 463/31
7,128,649 B2   10/2006 Nobe et al.

FOREIGN PATENT DOCUMENTS

| JP | 08-305356 A | 11/1996 |
|----|-------------|---------|
| JP | 8-305356 A | 11/1996 |
| JP | 2000-325521 A | 11/2000 |
| JP | 2002-282539 A | 10/2002 |
| JP | 2003-053027 A | 2/2003 |
| JP | 2003-53027 A | 2/2003 |
| JP | 2003117234 A | 4/2003 |
| JP | 3566195 B | 6/2004 |
| JP | 3566195 B2 | 6/2004 |

OTHER PUBLICATIONS

Syukan Dreamcast Magazine, 2000/vol. 11, pp. 114-115, Mar. 31, 2000, Softbank Publishing Corporation (JP).

* cited by examiner

*Primary Examiner* — Melba Bumgarner
*Assistant Examiner* — Thomas H Henry
(74) *Attorney, Agent, or Firm* — Sughrue Mion, PLLC

(57) ABSTRACT

A game machine for giving more enjoyment to a player by using a timing instruction image for guiding the player to an evaluated timing. In the game machine for allowing the player to perform a game operation using a controller in time with game music, in order to give guidance to the player about when to execute the game operation, a first timing instruction image (reference arrow mark (48L)) is displayed on a display screen, and a second timing instruction image (special timing guide arrow mark (43)) gradually approaching the first timing instruction image is displayed on the display screen according to timing data stored in timing data storage means. Timing of the game operation executed by the player is compared with timing represented by the timing data stored in the timing data storage manes, the game operation executed by the player is evaluated, and a display position trajectory of the second timing instruction image on the display screen is changed depending on a result of the evaluation.

14 Claims, 10 Drawing Sheets

(a)

(b)

GAME MACHINE, GAME CONTROL METHOD, AND INFORMATION STORAGE MEDIUM

TECHNICAL FIELD

The present invention relates to a game machine, a game control method, and an information storage medium, and in particular, a game in which a first timing instruction image and a second timing instruction image are displayed to give guidance to a player about when to execute game operation by the display positions of the images.

BACKGROUND ART

In most music games in which a player enjoys executing game operation via a controller in time with game music, two types of timing instruction image are displayed on a game screen, and one of the images gradually approaches the other. Such music games are designed to cause at least one of two types of timing instruction image to approach the other in time with game music and in accordance with timing data which is created in advance. The gradual reduction in relative distance between those two types of timing instruction image informs a player of the impending arrival of a time to execute game operation. For example, Patent Document 1 listed below discloses a game machine for the music game of this type configured as a competing-type game.

[Patent Document 1] JP 3566195 B

DISCLOSURE OF THE INVENTION

Problem to be Solved by the Invention

In most cases according to prior art, a gap between a time when a player is supposed to execute game operation as guided by the timing instruction images and a time when the player actually executes game operation is measured, and how well or poorly the game operation has been executed is evaluated based on how large or small the gap is. The evaluation result is reflected in a game score which is displayed separately. Therefore, once the evaluation is made, the timing instruction image for the evaluated timing is no longer needed and, in many conventional music games, moves off the screen. However, letting the timing instruction image for the evaluated timing simply move across until it disappears from the game screen lacks interest.

The present invention has been made in view of the above problem, and it is therefore an object of the present invention to provide a game machine, a game control method, and an information storage medium which make a game more interesting with the use of a timing instruction image for an already evaluated timing.

Means for Solving the Problems

In order to solve the above-mentioned problem, a game machine according to the present invention, which allows a player to execute game operation using a controller in time with game music, includes: operation timing obtaining means for obtaining timing of the game operation executed using the controller; timing data storing means for storing timing data, the timing data indicating when to execute the game operation using the controller; first timing instruction image displaying means for displaying, on a display screen, a first timing instruction image in order to give guidance to the player about when to execute the game operation; second timing instruction image displaying means for displaying, on the display screen, a second timing instruction image in order to give guidance to the player about when to execute the game operation, the second timing instruction image being created based on the timing data which is stored in the timing data storing means, the second timing instruction image gradually approaching the first timing instruction image; game operation evaluating means for evaluating the game operation executed by the player by comparing the timing of the game operation timing that is obtained by the operation timing obtaining means with timing that is represented by the timing data stored in the timing data storing means; and trajectory changing means for changing a display position trajectory of the second timing instruction image on the display screen depending on a result of the evaluation made by the game operation evaluating means.

Further, a game control method according to the present invention, which allows a player to execute game operation using a controller in time with game music, includes: an operation timing obtaining step of obtaining timing of game operation executed using the controller; a first timing instruction image displaying step of displaying, on a display screen, a first timing instruction image in order to give guidance to the player about when to execute the game operation; a second timing instruction image displaying step of displaying, on the display screen, a second timing instruction image in order to give guidance to the player about when to execute the game operation, the second timing instruction image being created based on timing data which is stored in timing data storing means, the timing data indicating a time when game operation should be executed using the controller, the second timing instruction image gradually approaching the first timing instruction images; a game operation evaluation step of evaluating a game operation that is executed by the player by comparing the timing of the game operation that is obtained in the operation timing obtaining step with timing that is represented by the timing data stored in the timing data storing means; and a trajectory change step of changing a display position trajectory of the second timing instruction image on the display screen depending on a result of the evaluation made in the game operation evaluation step.

Further, a computer-readable information storage medium according to the present invention stores a program which causes a computer to function as a game machine which allows a player to execute game operation using a controller in time with game music, the program causing the computer to function as: operation timing obtaining means for obtaining timing of the game operation executed using the controller; timing data storing means for storing timing data, the timing data indicating when to execute the game operation using the controller; first timing instruction image displaying means for displaying, on a display screen, a first timing instruction image in order to give guidance to the player about when to execute the game operation; second timing instruction image displaying means for displaying, on the display screen, a second timing instruction image in order to give guidance to the player about when to execute the game operation, the second timing instruction image being created based on the timing data which is stored in the timing data storing means, the second timing instruction image gradually approaching the first timing instruction image; game operation evaluating means for evaluating the game operation executed by the player by comparing the timing of the game operation that is obtained by the operation timing obtaining means with timing that is represented by the timing data stored in the timing data storing means; and trajectory changing means for changing a display position trajectory of the second timing instruction image on the display screen depending on a result of the evaluation made by the game operation evaluating means. This program may be stored in various computer-readable information storage media including CD-ROMs, DVD-ROMs, and ROM cartridges. The computer is, for example, a home-use gaming machine, a business-use gaming machine, a portable gaming machine, a cellular phone, a personal computer, or a server computer.

According to the present invention, an evaluation is made for game operation executed by a player and a display position on a display screen of a second timing instruction image used to give guidance to the player about when to execute the game operation moves along a trajectory that is varied depending on the result of the evaluation. This enables the player to know, from the trajectory of the display position on the display screen of a timing instruction image for already evaluated timing, how their game operation is evaluated each time the game operation is executed. The interest of the game of this type is thus enhanced.

According to an aspect of the present invention, when the evaluation made by the game operation evaluating means yields a given result, the trajectory changing means uses the timing data stored in the timing data storing means to determine timing to newly execute game operation, and changes the trajectory of the display position on the display screen of the second timing instruction image such that the second timing instruction image serves as a guide to the determined timing. According to this aspect, timing to newly execute game operation is determined based on the timing data in the case where game operation executed by the player is evaluated as a given level or higher, in the case where the evaluation result does not reach a given level, or the like. Then the trajectory of the display position of a timing instruction image for already evaluated timing is changed such that this timing instruction image serves as a guide to the determined timing. This makes the timing guidance irregular and unpredictable, thereby enhancing the interest of the game of this type.

Also, according to this aspect, the trajectory changing means may determine, as the timing to newly execute game operation, a time that follows a time represented by the timing data which is stored in the timing data storing means by a given period of time. In this way, the player can again receive guidance about when to execute game operation in time with game music.

According to another aspect of the present invention, the timing data stored in the timing data storing means represents multiple candidates for timing to execute game operation. The second timing instruction image displaying means displays multiple second timing instruction images, each of which is associated with the timing candidates represented by the timing data in the timing data storing means in such a manner that makes the second timing instruction images gradually approach the first timing instruction image. In the case where the game operation evaluating means makes an evaluation about the second timing instruction image for one of the candidates for timing to execute game operation, and the evaluation yields a given result, the trajectory changing means moves the second timing instruction image for this timing toward the second timing instruction image for another of the candidates for timing to execute game operation while guidance for the other timing is withheld from the player. This makes it possible to withhold giving timing guidance to a player depending on how well game operation is evaluated and, in addition, enables the player to easily understand, from the trajectory of the second timing instruction image, of which timing guidance has been withheld.

BEST MODE FOR CARRYING OUT THE INVENTION

An embodiment of the present invention is described in detail below with reference to the drawings.

Figure 1:
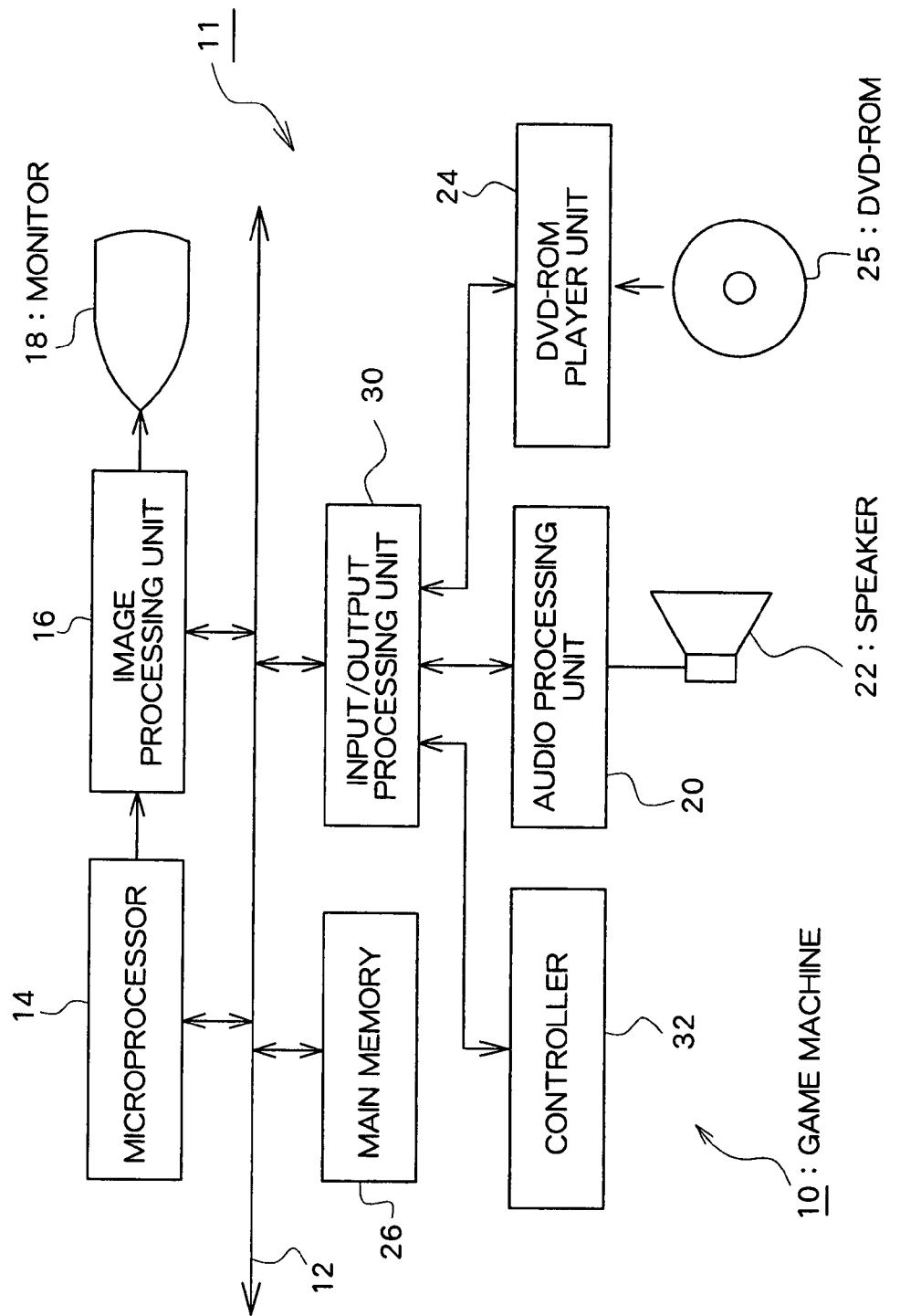
FIG. 1 is a diagram showing a hardware configuration of a game machine according to an embodiment of the present invention.

FIG. 1 is a diagram showing a hardware configuration of a game machine according to the embodiment of the present invention. The game machine shown in FIG. 1 is denoted by reference numeral 10 and is structured such that a DVD-ROM 25, which is a computer-readable information storage medium, is loaded in a home-use gaming machine 11, which is connected to a monitor 18 and a speaker 22. The home-use gaming machine 11 is a known computer game system. Here, the DVD-ROM 25 stores a game program and game data for a music game, and a dedicated controller is connected thereto as a controller 32. Instead of the DVD-ROM 25, various other computer-readable information storage media including CD-ROMs and ROM cartridges may be employed to provide the game program and the game data to the home-use gaming machine 11. The game program and the game data may also be provided to the home-use gaming machine 11 from a remote site via a communication network. In addition, a general-purpose controller may be employed as the controller 32.

The home-use gaming machine 11 has a microprocessor 14, an image processing unit 16, a main memory 26, and an input/output processing unit 30, which are connected by a bus 12 in a manner that allows them to communicate data with one another. The controller 32, an audio processing unit 20, and a DVD-ROM player unit 24 are connected to the input/output processing unit 30. Other components of the home-use gaming machine 11 besides the controller 32 are housed in a casing. A household television set, for example, is employed as the monitor 18, and a built-in speaker of the television set, for example, is employed as the speaker 22.

The microprocessor 14 controls the components of the home-use gaming machine 11 in accordance with an operating system stored in a not-shown ROM and the game program read out of the DVD-ROM 25. The bus 12 enables the components of the home-use gaming machine 11 to exchange addresses and data. The game program and the game data that are read out of the DVD-ROM 25 are written in the main memory 26 as required. The image processing unit 16 contains a VRAM in which a game screen is drawn from image data sent by the microprocessor 14. The image processing unit 16 converts the game screen into video signals and outputs the video signals to the monitor 18 on a given schedule.

The input/output processing unit 30 is an interface for relaying data communications of the microprocessor 14 to and from the controller 32, the audio processing unit 20, and the DVD-ROM player unit 24. The controller 32 is an input unit with which a player executes game operation. The input/output processing unit 30 regularly (e.g., at 1/60 second intervals) scans operation states of buttons using the controller 32, and sends operation signals indicating the scan results to the microprocessor 14 via the bus 12. The microprocessor 14 obtains from the operation signals the type and timing of game operation executed by the player. The audio processing unit 20 contains a sound buffer, which temporarily stores data of music, game sound effects, and the like that are read out of the DVD-ROM 25. The audio processing unit 20 reproduces the temporarily stored data and outputs the data from the speaker 22. The DVD-ROM player unit 24 follows an instruction from the microprocessor 14 in reading the game program, the game data, and other data recorded in the DVD-ROM 25.

Figure 2:
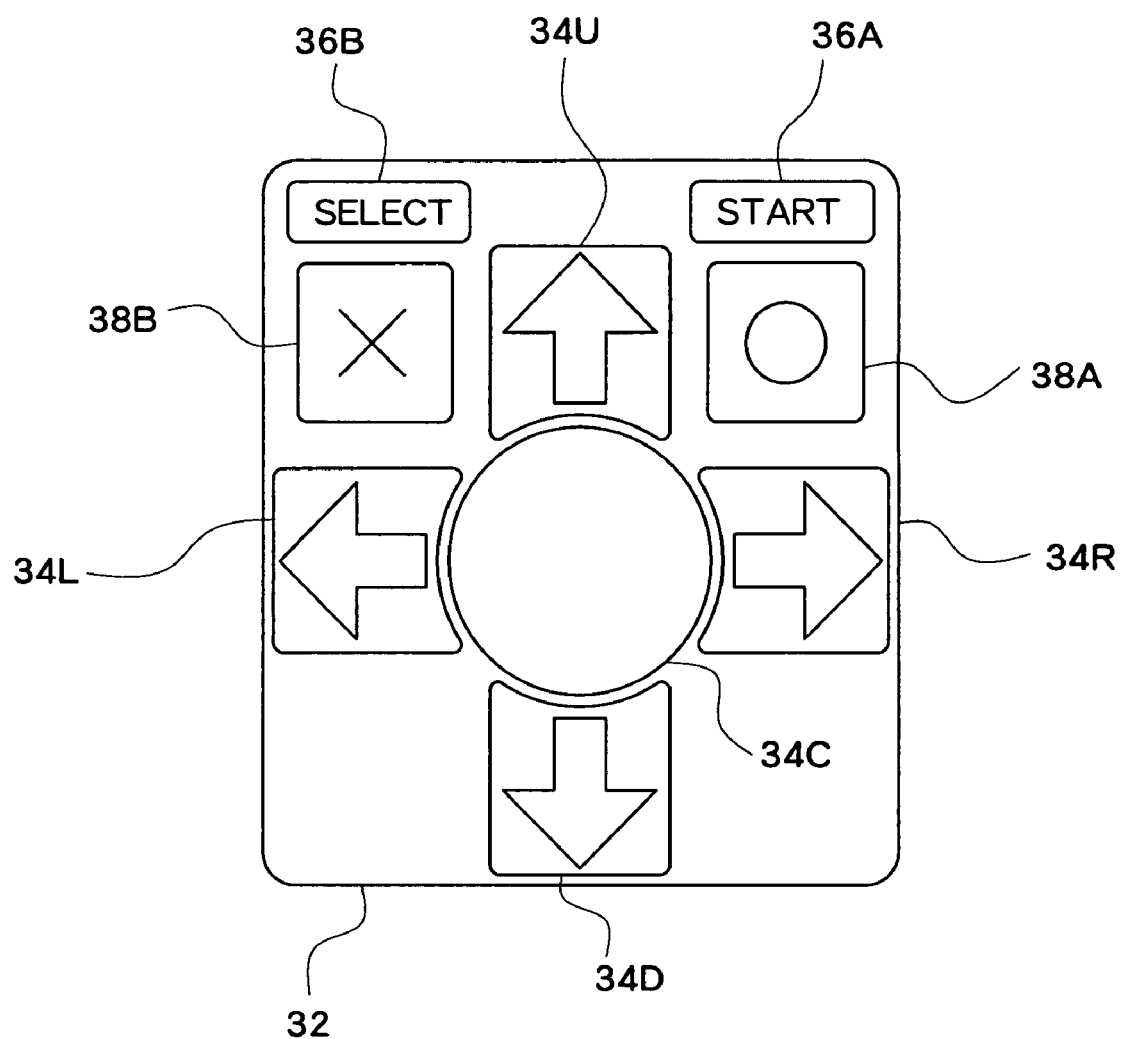
FIG. 2 is a diagram showing an example of a controller.

FIG. 2 is a diagram showing an example of the controller 32. The controller 32 shown in FIG. 2 is a dedicated controller that is specially prepared for playing of music games, and is constituted of a mat-like member large enough to be suitable as a dance stage. When a player steps onto the controller 32, operation signals indicating the position(s) of the player's foot (feet) using the controller 32 are sent to the home-use gaming machine 11. As shown in FIG. 2, the controller 32 has, at the center of its front surface, a central area 34C which is a substantially circular sectioned area. Other sectioned areas, namely, directional button input areas 34U, 34D, 34L, and 34R are above and below the central area 34C, and to the left and right of the central area 34C, respectively. Sectioned areas to the right and left of the directional button input area 34U are a circle button input area 38A and a cross button input area 38B, respectively. A sectioned area above the circle button input area 38A is a start button input area 36A. A sectioned area above the cross button input area 38B is a select button input area 36B. A right-pointing arrow pattern is shown in the directional button input area 34R. A left-pointing arrow pattern is shown in the directional button input area 34L. An upward-pointing arrow pattern is shown in the directional button input area 34U. A downward-pointing arrow pattern is shown in the directional button input area 34D. A circular mark (O) is shown in the circle button input area 38A. A cross mark (X) is shown in the cross button input area 38B. A string of letters "START" is shown in the start button input area 36A. A string of letters "SELECT" is shown in the select button input area 36B.

Sensors are buried under the directional button input areas 34U, 34D, 34L, and 34R, the circle button input area 38A, the cross button input area 38B, the start button input area 36A, and the select button input area 36B. When a player's foot is put on one of the input areas, a message to that effect is sent as an operation signal to the home-use gaming machine 11. The directional button input areas 34U, 34D, 34L, and 34R are used mainly for inputting dance steps, and also for selecting various menus. The start button input area 36A is used to start the game, confirm various choices, and the like. The select button input area 36B is used mainly for calling up various menu screens. The circle button input area 38A is used mainly to confirm various choices. The cross button input area 38A is used to cancel various decisions, and to forcedly end the game.

Figure 3:
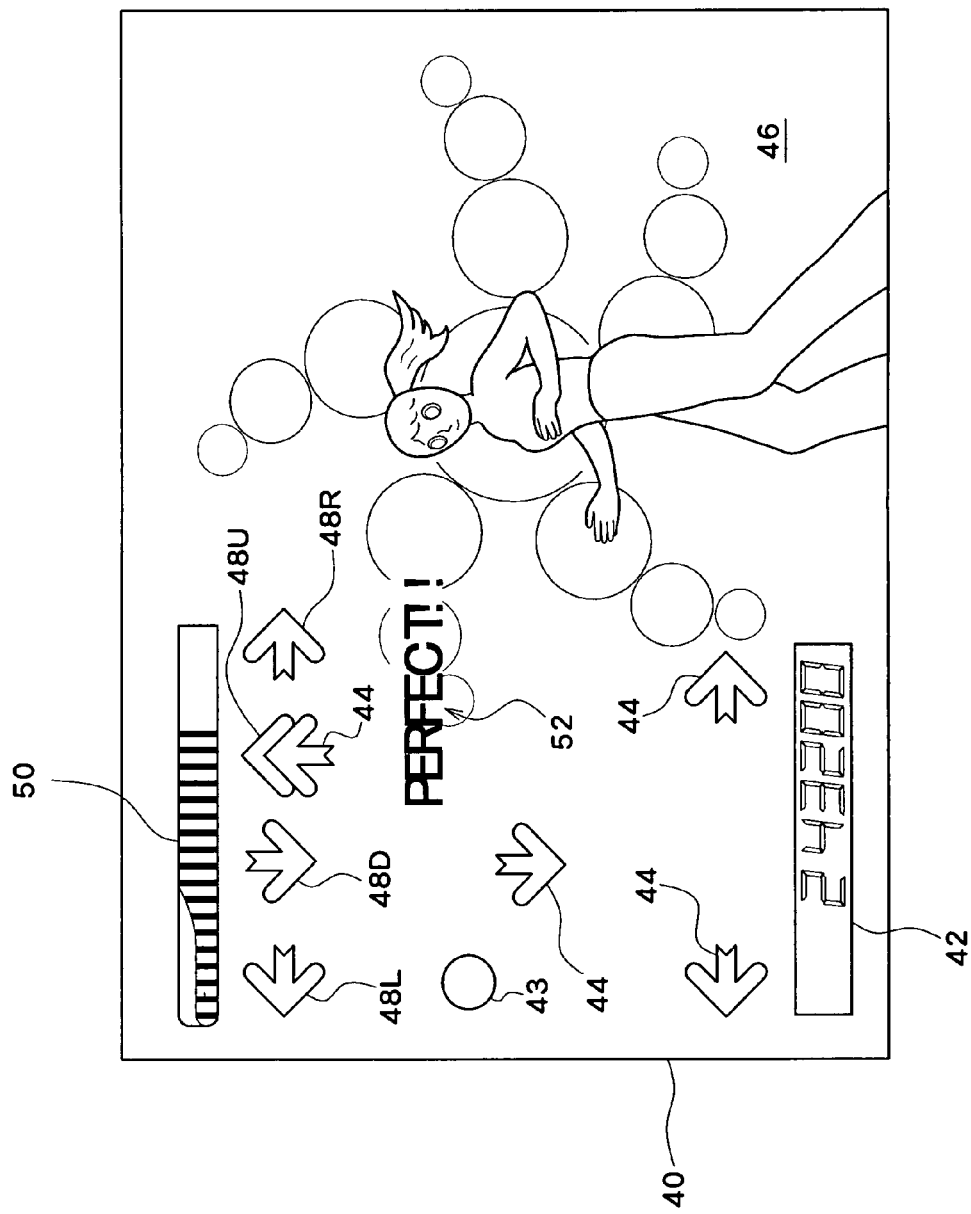
FIG. 3 is a diagram showing an example of a game screen.

FIG. 3 is a diagram showing an example of a game screen displayed on the monitor 18 based on the game program and the game data that are read out of the DVD-ROM 25. The game screen shown in FIG. 3 is denoted by reference numeral 40, and a background image 46 is displayed on the entire game screen 40. Overlaid on the background image 46 are a dance gauge 50, reference arrow marks (first timing instruction images) 48L, 48D, 48U, and 48R, timing guide arrow marks (second timing instruction images) 44, a special timing guide arrow mark (second timing instruction image) 43, a score 42, and a message 52. The timing guide arrow marks 44 and the special timing guide arrow mark 43 are displayed in a relatively large screen area below the reference arrow marks 48L, 48D, 48U, and 48R, and with time move upward, namely, toward where the reference arrow marks 48L, 48D, 48U, and 48R are displayed. A player is thus given guidance about when to execute game operation. FIG. 3 shows the special timing guide arrow mark 43 only below the reference arrow mark 48L, but the special timing guide arrow mark 43 may also be displayed below the reference arrow marks 48D, 48U, and 48R. Details of the special timing guide arrow mark 43 will be described later. The score 42 is displayed in the lowest part on the left-hand side of the game screen 40, and shows the cumulative points up to the present. The message 52 is displayed in the middle part on the left-hand side of the screen, and shows in text how well or poorly a player has executed game operation. Examples of the message 52 include "GREAT", "PERFECT", "GOOD", and "BOO".

The dance gauge 50 is displayed in an upper left part of the screen, and contains a gauge bar which stretches or retracts depending on how well or poorly game operation is executed. For instance, in the case where game operation is evaluated highly, the gauge bar extends rightward whereas the gauge bar retracts leftward in the case where game operation earns only a low evaluation. The game is over when the gauge bar becomes shorter than a given length, and a player judges from the dance gauge 50 whether gameover is close or not. The reference arrow marks 48L, 48D, 48U, and 48R are displayed below the dance gauge 50 in the stated order. The reference arrow marks 48L, 48D, 48U, and 48R are references based on which a player determines when to execute game operation.

That is, the reference arrow mark 48L is associated with the directional button input area 34L. The reference arrow mark 48D is associated with the directional button input area 34D. The reference arrow mark 48U is associated with the directional button input area 34U. The reference arrow mark 48R is associated with the directional button input area 34R. At the time when each of the timing guide arrow marks 44 or the special timing guide arrow mark 43 overlaps the reference arrow marks 48L, 48D, 48U, and 48R, a player steps on one or more of the directional button input areas 34L, 34D, 34U, and 34R that are associated with the overlapped reference arrow marks 48L, 48D, 48U, and 48R. The player thus obtains a high evaluation score. FIG. 3 shows a situation in which the player is requested to step on the directional button input area 34U, step on the directional button input area 34L, step on the directional button input area 34D, and step on the directional button input areas 34L and 34R, in the stated order. When a time at which the player is requested to step arrives, how well or poorly the player has executed the game operation is displayed below the reference arrow marks 48. Specifically, a message reflecting the degree of matching between the guided step position and timing and the player's actual step position and timing is displayed. Examples of the message include "PERFECT", "GREAT", "GOOD", and "BOO" in descending order of the matching degree.

The player is not necessarily required to operate the controller 32 at the exact time when each of the timing guide arrow marks 44 or the special timing guide arrow mark 43 overlaps each of the reference arrow marks 48 in order to obtain a positive evaluation score. An evaluation score according to the degree of matching between the marks is given. The timing guide arrow marks 44 and the special timing guide arrow mark 43 are displayed in accordance with step data, which will be described later.

The timing guide arrow marks 44 and the special timing guide arrow mark 43 are, specifically, displayed as follows. For example, in the case where a guidance display range is set such that timing guidance is displayed for steps to be stepped in one measure from the present time, when the game music starts to be played, the microprocessor 14 reads, from step data, step timing contained within the guidance display range. Based on the step data, the microprocessor 14 creates image data representing the timing guide arrow marks 44 and the special timing guide arrow mark 43. The image data contains display positions adjusted such that a mark for the earliest step timing is displayed in the uppermost part of the game screen while marks for subsequent step timing are displayed below the mark for the earliest step timing in chronological order. This processing is repeated in given cycles.

In the processing, the timing guide arrow mark 44 and/or the special timing guide arrow mark 43 that indicate when to step on the directional button input area 34L are displayed below the reference arrow mark 48L. The timing guide arrow mark 44 and/or the special timing guide arrow mark 43 that indicate when to step on the directional button input area 34D are displayed below the reference arrow mark 48D. The timing guide arrow mark 44 and/or the special timing guide arrow mark 43 that indicate when to step on the directional button input area 34U are displayed below the reference arrow mark 48U. The timing guide arrow mark 44 and/or the special timing guide arrow mark 43 that indicate when to step on the directional button input area 34R are displayed below the reference arrow mark 48R.

The head of the guidance display area, in other words, the display position of the reference arrow marks 48 (the position in the vertical direction of the screen), corresponds to what part of the game music is being played at that point in time. The guidance display range is moved from the head of the tune toward the end of the tune by a predetermined amount of the movement in every processing cycle. In this way, the timing guide arrow marks 44 and the special timing guide arrow mark 43 are gradually moved upward as the tune progresses. Causing the timing guide arrow marks 44 and the special timing guide arrow mark 43 to gradually approach the reference arrow marks 48 in this manner enables a player to easily recognize on the game screen 40 how soon step timing arrives.

Figure 4:
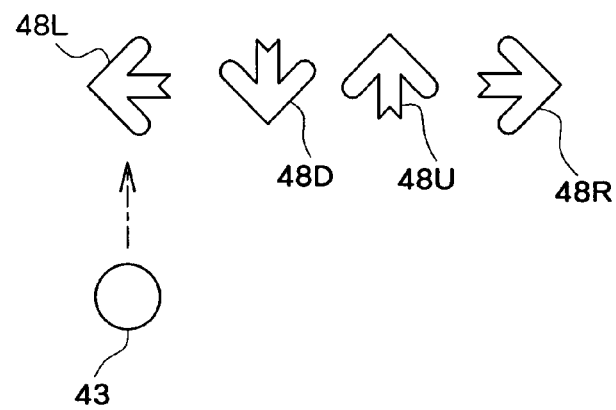
FIG. 4 is a diagram showing movement of a display position of a special timing guide mark.
Figure 5:
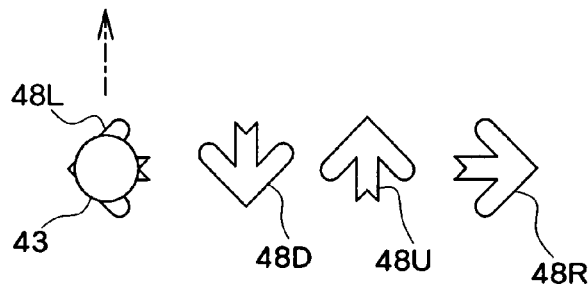
FIG. 5 is a diagram showing movement of a display position of the special timing guide mark.

Details of the special timing guide arrow mark 43 will now be described. The normal timing guide arrow marks 44 move upward from below the respective reference arrow marks 48 until they overlap with the reference arrow marks 48, then continue to move to the upper part of the screen, and disappear off the screen. On the other hand, the special timing guide arrow mark 43 moves upward until it overlaps with one of the reference arrow marks 48, and the subsequent display position of the special timing guide arrow mark 43 moves along a trajectory that is varied depending on how large a gap there is between the time when the special timing guide arrow mark 43 overlaps with the reference arrow mark 48 and the time when game operation is executed by the player, namely, how well or poorly the player executes game operation. As shown in FIG. 4, the special timing guide arrow mark 43 starts from the lower part of the screen and gradually approaches one of the reference arrow marks 48 (48L shown in FIG. 4). The special timing guide arrow mark 43 subsequently overlaps with the reference arrow mark 48L as shown in FIG. 5. Thereafter, if game operation is executed poorly, in other words, if a gap between the time when the special timing guide arrow mark 43 overlaps with the reference arrow mark 48L and the time when the player steps on the directional button input area 34L is larger than a given amount, the special timing guide arrow mark 43 continues to move to the upper part of the screen and moves out of the screen.

Figure 6:
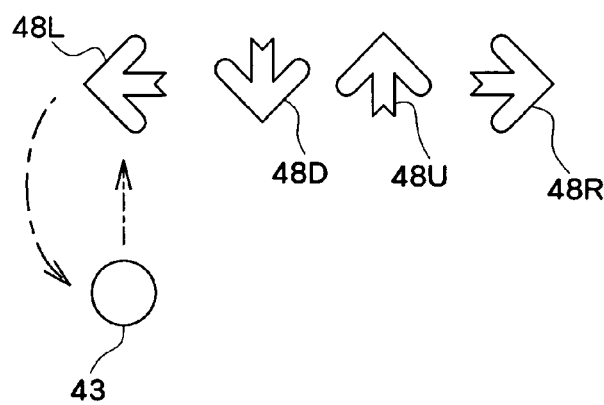
FIG. 6 is a diagram showing movement of a display position of the special timing guide mark.

In the case where the gap is smaller than the given amount, the special timing guide arrow mark 43 moves, as shown in FIG. 6, a little downward on the screen and then moves toward the reference arrow mark 48L (upward on the screen) again. New timing is thus presented to the player. In the following description, this new timing is referred to as post-shift special timing while the original timing, namely, the timing that is indicated by the same special timing guide arrow mark 43 the first time around, is referred to as pre-shift special timing.

Figure 7:
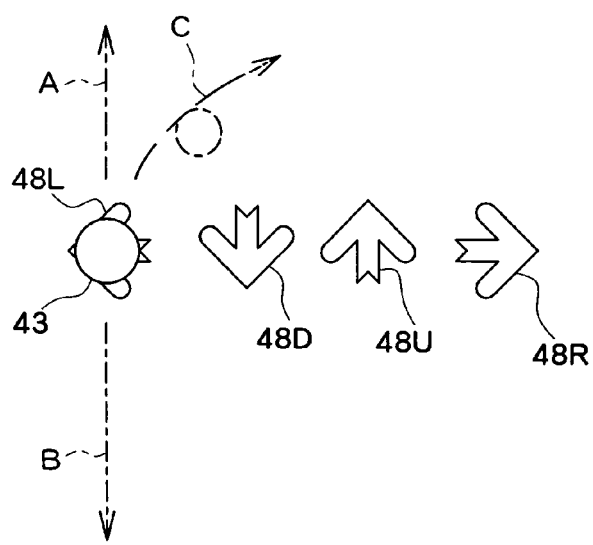
FIG. 7 is a diagram showing movement of a display position of the special timing guide mark.
Figure 8:
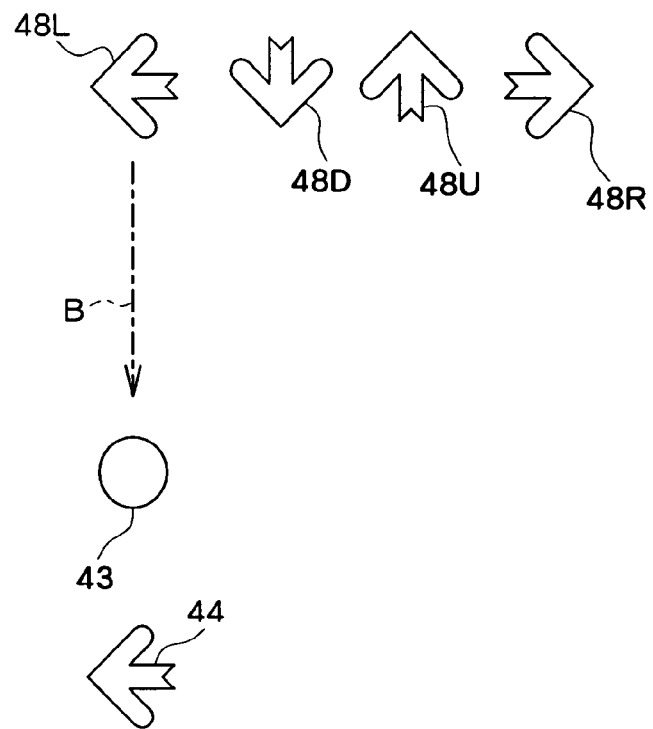
FIG. 8 is a diagram showing movement of a display position of the special timing guide mark.

The trajectory of the special timing guide arrow mark 43 is further varied depending on how well or poorly game operation is executed with respect to the newly presented post-shift special timing. After overlapping with the reference arrow mark 48L, the special timing guide arrow mark 43 moves along one of trajectories A to C shown in FIG. 7 depending on how well or poorly the player executes game operation at the post-shift special timing. Specifically, in the case where the gap between the time when the special timing guide arrow mark 43 overlaps with the reference arrow mark 48L and the time when the player steps on the directional button input area 34L is equal to or larger than a first given amount, the special timing guide arrow mark 43 moves along the trajectory A to the upper part of the screen and then out of the screen. In the case where the gap is smaller than the first given amount and equal to or larger than a second given amount, which is smaller than the first given amount, the special timing guide arrow mark 43 moves along the trajectory C to the right-hand side of the screen and then out of the screen. In the case where the gap is smaller than the second given amount, the special timing guide arrow mark 43 moves along the trajectory B to again move downward on the screen. The special timing guide arrow mark 43 on the trajectory B approaches, as shown in FIG. 8, another timing guide arrow mark (timing guide arrow mark 44) approaching the same reference arrow mark 48L. Upon contact with each other, the two images jump away from each other and disappear off the screen. The timing guide arrow mark 44 with which the special timing guide arrow mark 43 has come into contact thus no longer serves as a guide to game operation timing. This means that a player can reduce the number of times they are required to execute game operation by performing game operation well. In some cases, multiple timing guide arrow marks 44 are displayed below each reference arrow mark 48. Then, all the timing guide arrow marks 43 that are approaching the same reference arrow mark 48 are scattered for theatrical display, and timing indicated by any of these timing guide arrow marks 44 is no longer presented to the player.

The special timing guide arrow mark 43 may change its image suitably while being displayed. The special timing guide arrow mark 43 may be a still image or an animated image such as an animation picture.

Data stored in the DVD-ROM 25 will now be described. The DVD-ROM 25 stores a game program, various types of game sound effects data, and various types of game image data, as well as game music data, in order to make the home-use gaming machine 11 function as a music game.

Figure 9:
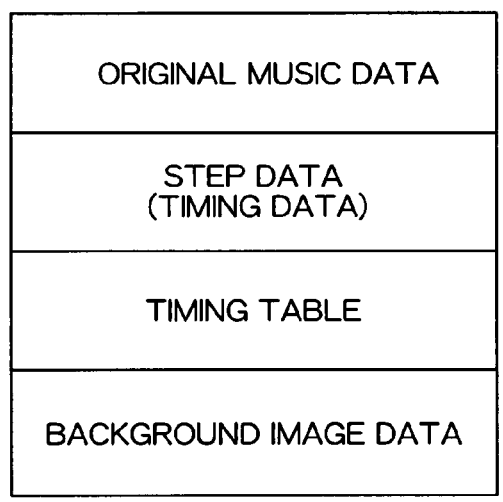
FIG. 9 is a diagram showing a structure of game music data.

FIG. 9 is a diagram illustrating game music data that corresponds to specific game music and is stored in the DVD-ROM 25. As shown in this figure, the game music data contains original music data, step data, a timing table, and background image data. The original music data is, for example, generally-available popular music or the like saved as original music in a given stream data format. The DVD-ROM player unit 24 reads the original music data in accordance with an instruction from the microprocessor 14, and performs data processing on the original music data if necessary. The DVD-ROM player unit 24 is capable of supplying the read (and processed) original music data directly to the audio processing unit 20 instead of sending the data over the bus 12. After receiving the data directly from the DVD-ROM player unit 24, the audio processing unit 20 puts the data through D/A conversion, and supplies the converted data to the speaker 22.

The step data (timing data) defines timing at which a player should step (execute game operation) while the corresponding game music is played. The step data reflects rhythms of the corresponding game music. Multiple sets of step data may be prepared for one piece of game music so that different step data sets are used for different difficulty levels, play modes, or the like. The step data specifies which one of the directional button input areas 34 of the controller 32 should be stepped on at which beat in the case where a measure of the corresponding game music is divided into a given number of beats, for example, four beats, or eight beats.

The timing table is prepared in order to match timings of the step data and the game music. The microprocessor 14 consults the timing table to identify which step data corresponds to a part of the game music that is currently being played. The background image data represents an image that is displayed as the background of the game screen 40 shown in FIG. 3, for example. The background image data may be animated image data or still image data. For each piece of game music, a background image that fits the feel of the game music is chosen to provide a visual help in putting a player into the mood.

Figure 10:
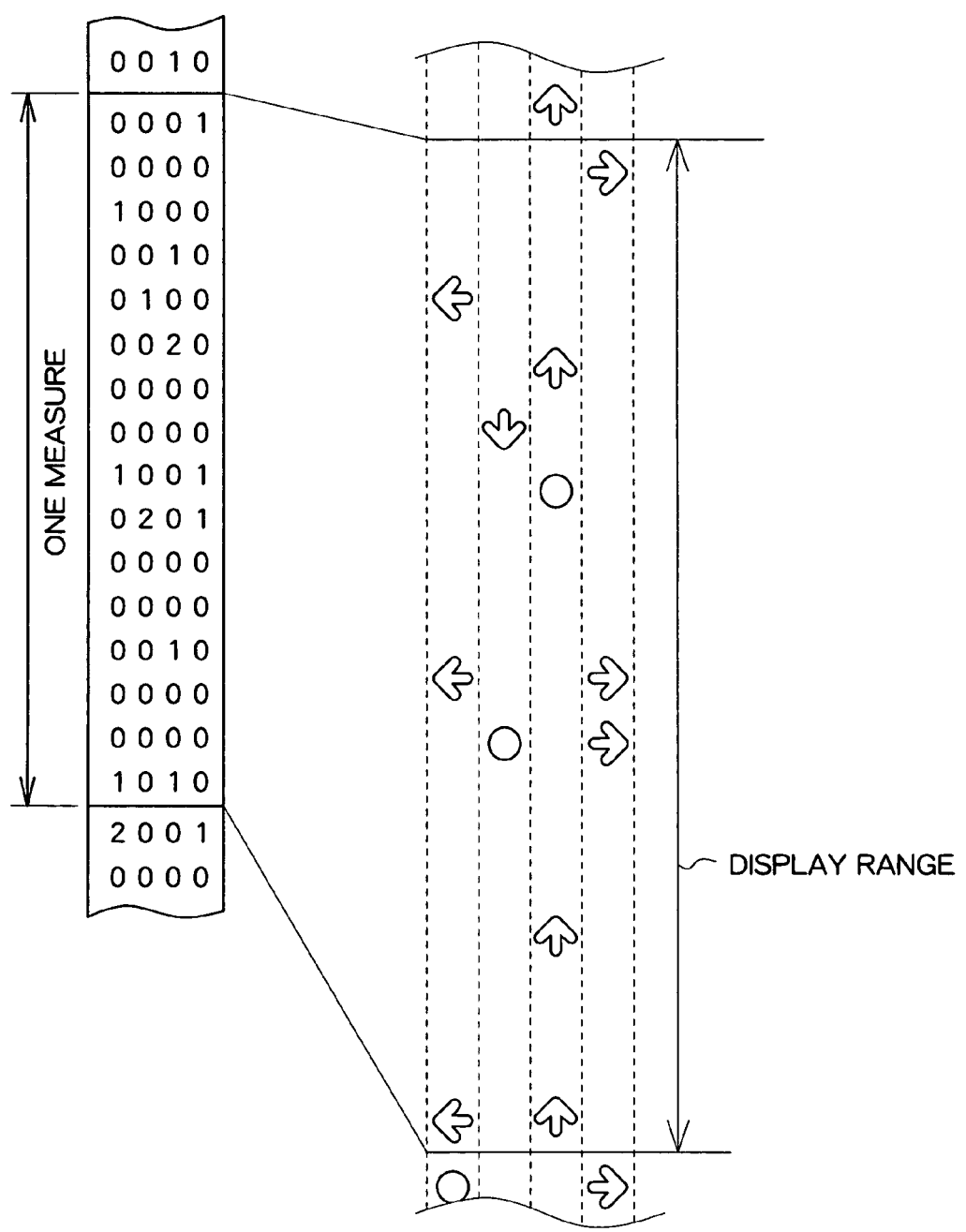
FIG. 10 is a diagram showing a procedure of compositing timing guide arrow marks and the special timing guide arrow mark from step data.

Processing for displaying the timing guide arrow marks 44 and the special timing guide arrow mark 43 based on the step data will now be described. FIG. 10 is a diagram showing an example of the step data. The data format of the step data here is determined such that step timing is specified on a 1/16-th measure basis, and the step data contains, for each reference arrow mark 48, data representing timing that is 1/16 of a measure. Each of the data has a value "0", "1", "2", or "3". The value "0" indicates that the directional button input area 34 in question should not be stepped on whereas "1", "2", and "3" indicate that the directional button input area 34 in question should be stepped on. Specifically, "1" indicates that the timing in question is normal timing indicated by the timing guide arrow marks 44. "2" indicates that the timing in question is pre-shift special timing indicated by the special timing guide arrow mark 43. "3" indicates that the timing in question is post-shift special timing indicated by the special timing guide arrow mark 43 as will be described later. In the case where the guidance display range is one measure, for example, the display positions of the timing guide arrow marks 44 and the special timing guide arrow mark 43 are determined such that successive steps in one measure are spread all over the game screen from top to bottom, and prepared images of the timing guide arrow marks 44 and the special timing guide arrow mark 43 are composited with the game screen 40.

Figure 11:
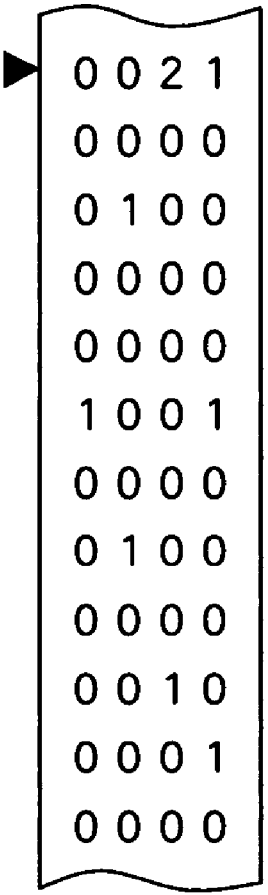
FIG. 11 are diagrams showing a change that occurs to the step data in the case where timing at which game operation is actually executed is close to timing that is indicated by the special timing guide arrow mark (pre-shift special timing).
Figure 11:
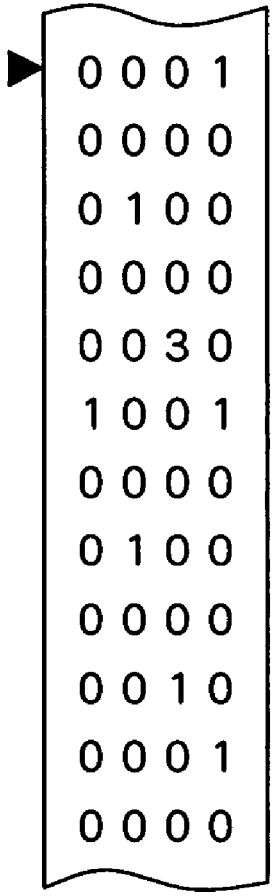

As described above, when a game operation evaluation yields a given result, the special timing guide arrow mark 43 changes its trajectory and again gives timing guidance in order to present new timing. This game machine 10 reads the above-mentioned step data into the main memory 26 and changes the data suitably during the game. Specifically, in the case where "2" is stored in the step data and the special timing guide arrow mark 43 is being displayed on the game screen 40, if the gap between pre-shift special timing indicated by this special timing guide arrow mark 43, namely, pre-shift special timing represented by this value "2" data, and timing at which the player actually executes game operation as guided is smaller than a given amount, a time that follows the pre-shift special timing represented by this value "2" data by a given period of time (here, four minutes) is determined as new timing, namely, post-shift special timing. Subsequently, data among the timing data stored in the main memory 26 which is associated with the determined post-shift special timing is identified and "3", which indicates post-shift special timing, is written as the value of the identified data. FIG. 11 show a data change that occurs in this case.

Figure 12:
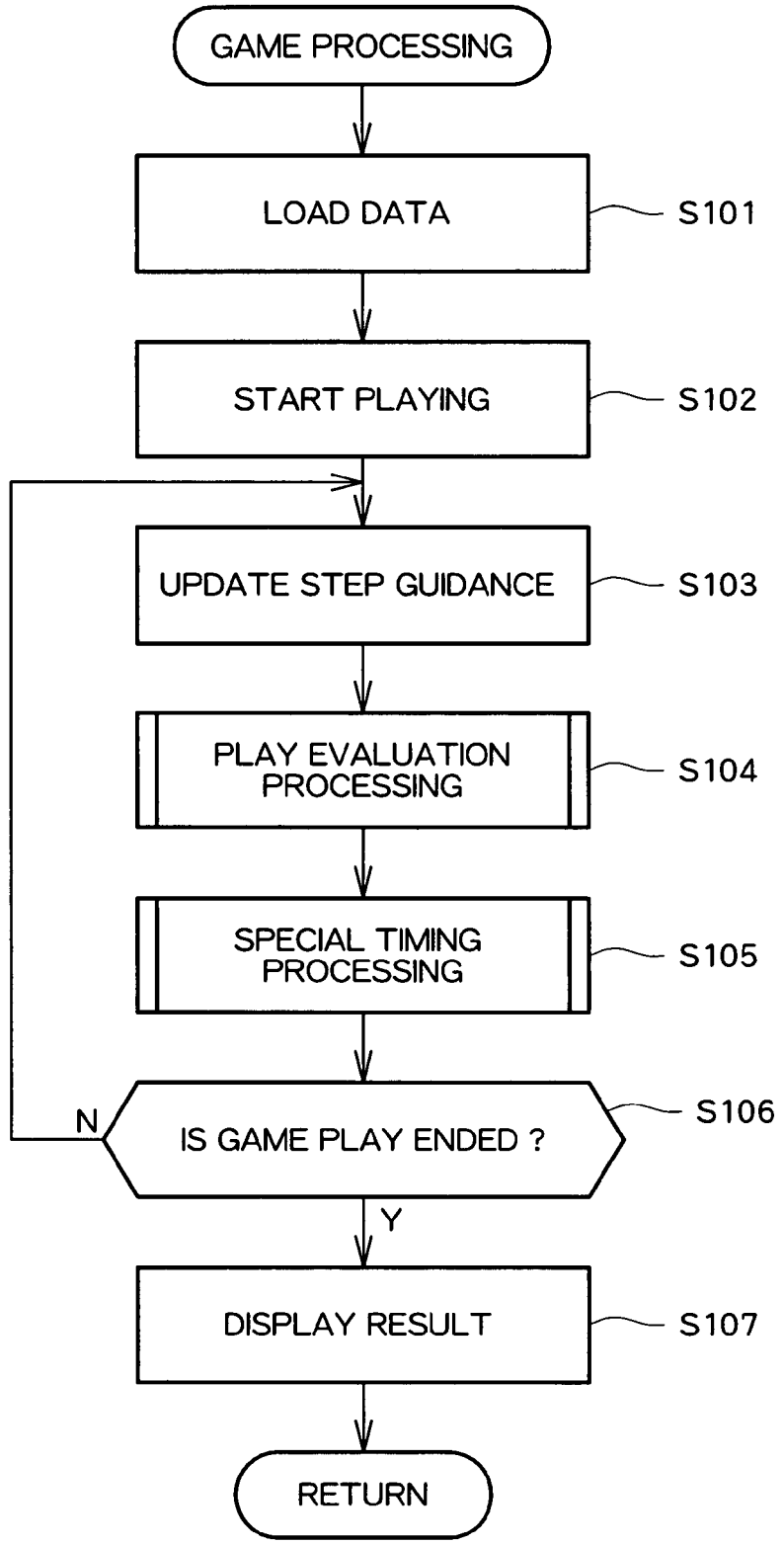
FIG. 12 is a flow chart showing game processing of the game machine according to the embodiment of the present invention.
Figure 13:
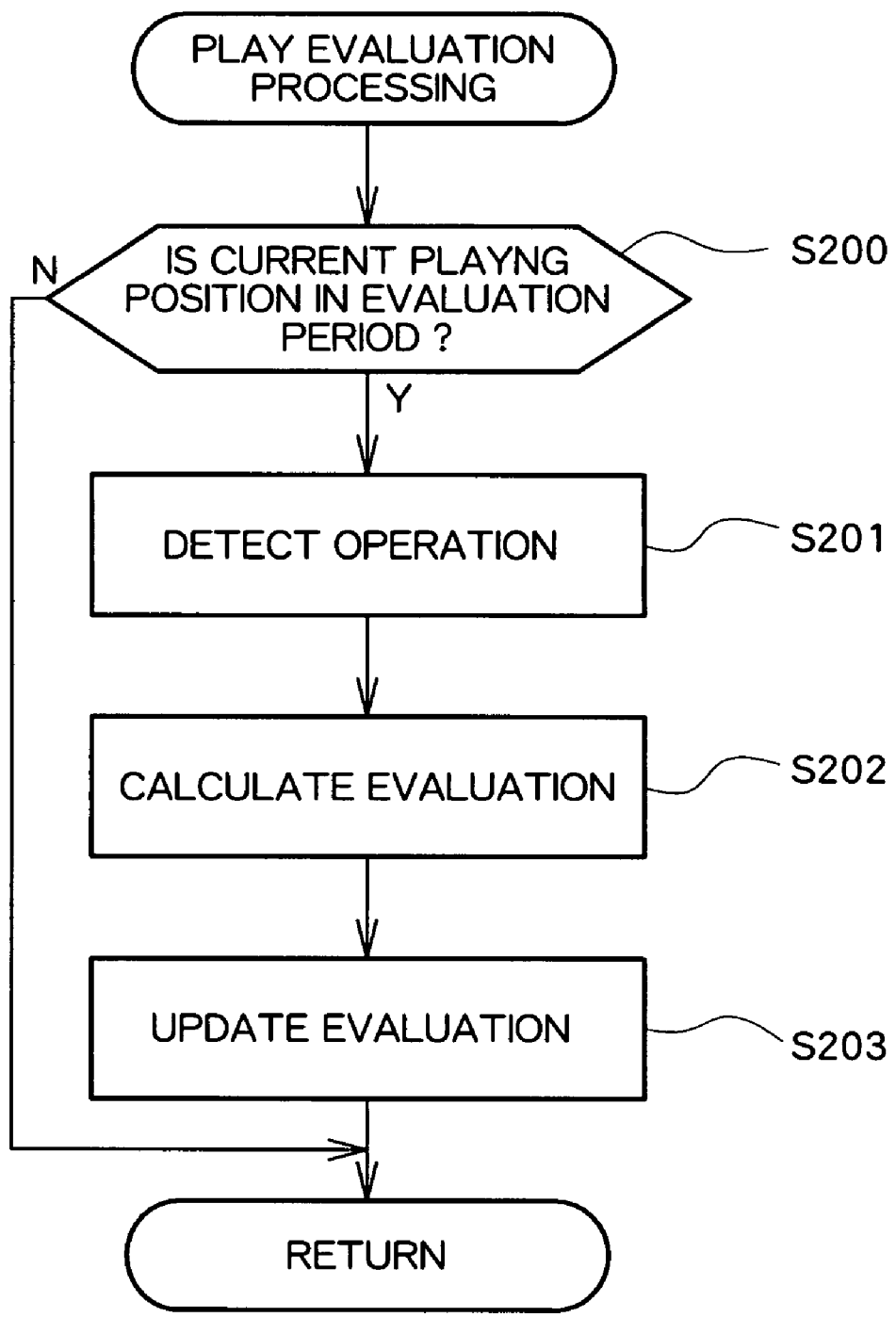
FIG. 13 is a flow chart showing play evaluation processing.
Figure 14:
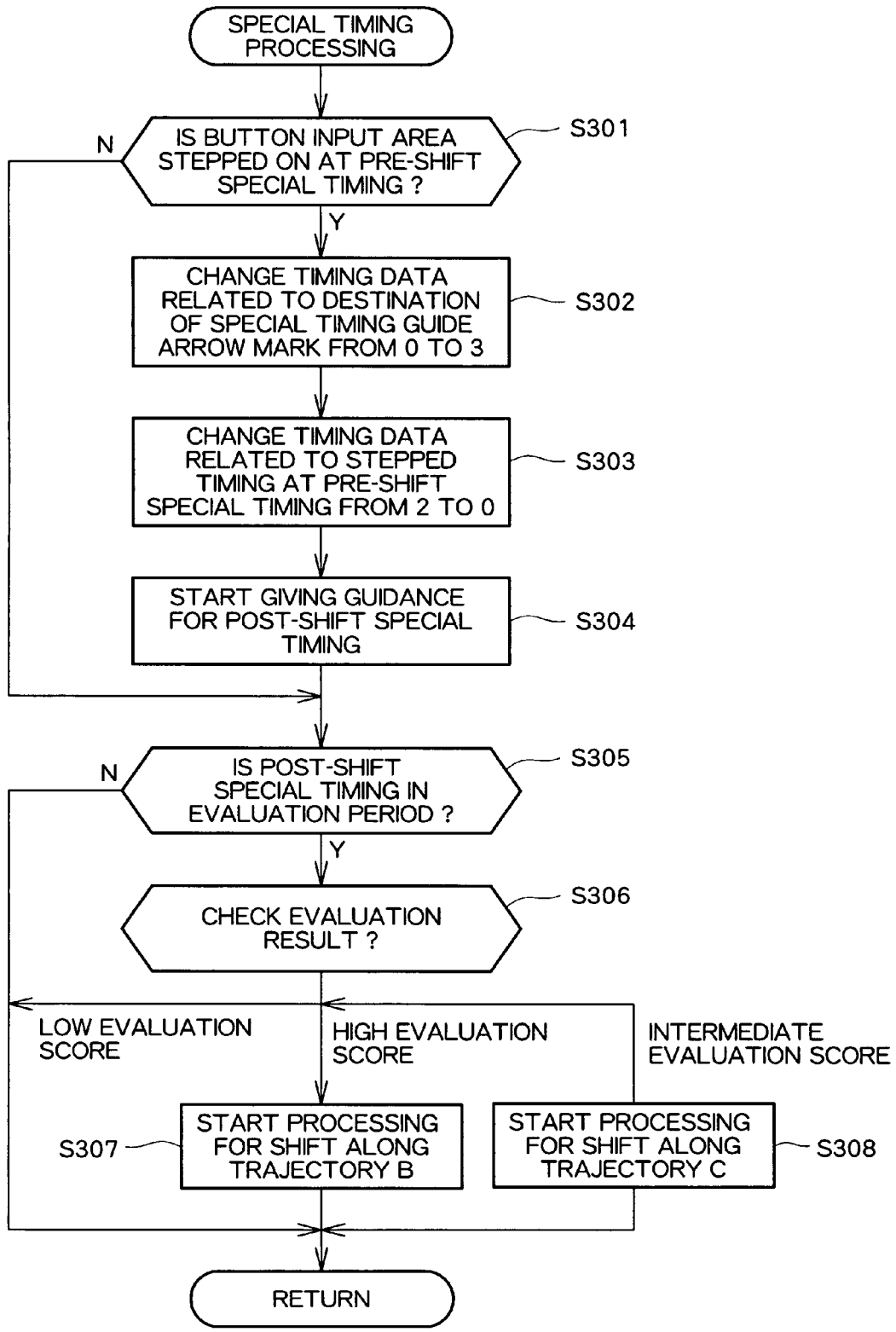
FIG. 14 is a flow chart showing special timing processing.

Processing of a game program executed by the home-use gaming machine 11 will now be described. FIGS. 12 through 14 are flow charts illustrating game processing of the game program stored in the DVD-ROM 25. This processing is executed when a player gives an instruction to start a game through the controller 32 and chooses music with which the player wishes to play, data relevant to the chosen game music tune is loaded first (S101). Specifically, a series of data shown in FIG. 9 is loaded. Of the loaded data, the original music data is sent from the DVD-ROM player unit 24 directly to the audio processing unit 20, and reproduction output is immediately started (S102). The rest of the data is loaded onto the main memory 26.

Next, the microprocessor 14 creates, based on the step data in the read game music data, image data for step guidance as shown in FIG. 3, for example, and outputs the step guidance image data to the monitor 18, thereby updating step guidance (S103). Step guidance here is given such that the timing guide arrow marks 44 and the special timing guide arrow mark 43 that are associated with value "1" data and value "2" data in the step data are displayed on the game screen 40. The microprocessor 14 uses the timing table in judging the association relation between the step data and the original music data. The step data and the timing table that are used by the microprocessor 14 are those associated with the tune that the player has chosen.

Play evaluation processing is then executed (S104). FIG. 13 is a flow chart illustrating the play evaluation processing. As shown in FIG. 13, a first step of the play evaluation processing is to judge whether or not the current playing position belongs to an evaluation period based on the current playing position and the step data (S200). An evaluation period is a period in which a player's step timing is compared with timing defined in the step data. If any of data in the step data associated with a specific instant has the value "1", "2", or "3", a given period which stretches before and beyond the instant is set as an evaluation period.

In the case where the current playing position belongs to an evaluation period, the operation state of the controller 32 of each player is obtained (S201), and steps of the each player are evaluated based on the obtained operation states (S202). On which of the directional button input areas 34L, 34U, 34D, and 34R the step that is currently in the evaluation period is made can be known from the step data. Therefore, it is judged here whether or not one of the directional button input areas 34L, 34U, 34D, and 34R that is an evaluation subject is actually stepped on, and it is examined how much the timing at which the area is stepped on is off from the timing that is defined by the step data. When the deviation amount is smaller, a higher evaluation score is given. For instance, the highest evaluation score is given when the deviation amount is zero, a zero evaluation score is given when the deviation amount is maximum, and a minus evaluation score is given in the case where a wrong or no directional button input area 34 is stepped on. In the case where steps made on more than one directional button input area 34 are evaluation subjects, the steps are evaluated in the same manner for each of the directional button input areas 34 stepped on.

Messages reflecting the evaluation results are displayed below the reference arrow marks 48, and displayed contents of the score 42 of a player and the dance gauge 50 are updated in accordance with the evaluation results (S203).

Referring to FIG. 12 again, processing for the special timing guide arrow mark 43 (which will be described later) is subsequently executed (S105). It is then judged whether or not the game play meets an ending condition (S106). Specifically, the game is ended when a player keeps depressing the start button input area 36A of the controller 32 for a given period of time, or when the tune that has been played comes to an end.

In the case where the game play meets the ending condition, a final result is displayed in accordance with the player's evaluation results stored in the main memory 26 (S107), and the game processing is ended. On the other hand, when it is judged that the game play does not meet the ending condition, the processing returns to S103.

FIG. 14 is a flow chart showing special timing processing of the game machine 10. The flow chart of FIG. 14 shows details of the processing of S105 shown in FIG. 12. A first step of this processing is to judge whether or not game operation executed by the player at pre-shift special timing (timing indicated by value "2" data in the step data) has resulted in a gap smaller than a given amount (S301). The judgment is made by referring to the processing result of S104. In the case where the game operation has resulted in a gap smaller than the given amount, a time that follows this pre-shift special timing by a given period of time is determined as post-shift special timing. Data in the step data stored in the main memory 26 which is associated with this post-shift special timing is then identified and the value of the identified data is changed from "0" to "3" (S302). Data that is associated with the pre-shift special timing is also changed, and its value is changed from "2" to "0" (S303). Subsequently, the trajectory of the special timing guide arrow mark 43 is changed and guidance for the post-shift special timing is started. As a result, the special timing guide arrow mark 43 moves from its initial display position which indicates the pre-shift special timing (the display position is indicated by the step data) toward a display position that indicates the post-shift special timing (the display position is indicated by the step data). This trajectory is determined based on the step timing data, specifically, data that is associated with the pre-shift special timing and data that is associated with the post-shift special timing. The special timing guide arrow mark 43 is thereafter displayed at the display position indicated by the data of the step data that represents the post-shift special timing, and gradually approaches the relevant reference arrow mark 48. In the case where the player's execution of game operation has not resulted in a gap smaller than the given amount, the processing of S301 through S304 are skipped.

The next step of the special timing processing is to judge whether or not an evaluation period has arrived with respect to the post-shift special timing (S305). In the case where the evaluation period has arrived, the evaluation result is checked (S306). The evaluation result here adopts the processing result of S104. In the case where the evaluation score is high, in other words, when the gap between the post-shift special timing and the actual game operation timing is smaller than the second given amount, theatrical display processing is started, in which the special timing guide arrow mark 43 moves along the trajectory B to the lower part of the game screen 40 and collides with another timing guide arrow mark (timing guide arrow mark 44) (S307). In the case where the evaluation score is intermediate, in other words, when the gap between the post-shift special timing and the actual game operation timing is equal to or larger than the second given amount and smaller than the first given amount, processing is started in which the special timing guide arrow mark 43 moves along the trajectory C and disappears off the game screen 40 (S308). In the case where the evaluation score is low, in other words, when the gap between the post-shift special timing and the actual game operation timing is equal to or larger than the first given amount, the trajectory changing processing of S307 or S308 is not started and the special timing guide arrow mark 43 continues to move upward on the screen.

According to the game machine 10 described above, game operation (stepping) executed by a player through the controller 32 is evaluated, and the display position on the game screen 40 of the special timing guide arrow mark 43 that is used to give guidance about when to execute the game operation moves along a trajectory that is varied depending on the evaluation score of the game operation. This enables the player to know, from the trajectory of the special timing guide arrow mark 43 which gives guidance of the evaluated timing, how their game operation is evaluated each time game operation is executed. The interest level of the game of this type is thus enhanced.

The present invention is not limited to the above embodiment.

For instance, while the description given above employs the example of carrying out the present invention with the home-use gaming machine 11, the present invention is similarly applicable to any computers including business-use game machines, portable gaming machines, cellular phones, personal computers, and server computers. Also, the DVD-ROM 25, which, in the above description, is used to supply a game program according to the embodiment of the present invention to a computer, may be replaced by any computer-readable information storage media.

Furthermore, while the game machine 10 to which the present invention is applied in the above description gives a player a dance-like exercise, the present invention is applicable to all sorts of music game including those played on a drum game machine with a controller simulating a drum pad and hit by drum sticks for fun, a Japanese-style drum game machine having a Japanese-style drum which is hit by Japanese-style drum sticks, a piano game machine with a controller simulating piano keys and hit by a player's fingers, a guitar game machine with a controller simulating a guitar and played for fun, a samba dance game machine with a controller simulating a maraca and played for fun, and a dance game machine with which hand motion of a player is detected through a controller and deftness in executing hand motions is the object of competition.

The invention claimed is:

1. A game machine, which allows a player to execute a game operation using a controller in time with game music, the game machine comprising a processor which runs a program capable of performing the functions of:
    obtaining timing of the game operation executed using the controller;
    storing timing data, the timing data indicating when to execute the game operation using the controller;
    displaying, on a display screen, a timing instruction image to guide the player about when to execute the game operation;
    displaying, on the display screen, a timing guide image, said timing guide image including a normal timing guide and a special timing guide for said player, to guide the player about when to execute the game operation, the special timing guide being created based on the stored timing data, the special timing guide gradually approaching the timing instruction image, wherein said special timing guide has an appearance that is substantially different from said normal timing guide;
    evaluating the game operation executed by the player by comparing the timing of the obtained game operation timing with timing represented by the stored timing data that the special timing guide is created from, to generate a time gap; and
    changing a display position trajectory of the special timing guide on the display screen when the time gap is smaller than a given amount, so as to inform said player of said evaluating each time the game operation is executed,
    wherein when the evaluation result is less than a predetermined time, the display position trajectory of the special timing guide is changed, so that the special timing guide turns from an initial trajectory having an initial direction to a special trajectory having a different direction from the initial direction, to collide with the normal timing guide and to cause the normal timing guide to disappear, and the player is no longer required to execute the game operation indicated by the normal timing guide.

2. A game machine according to claim 1, wherein the changing determines, when the evaluation made by the evaluating yields a given result, based on the stored timing data, timing to newly execute the game operation, and changes the trajectory of the display position of the special timing guide on the display screen such that the special timing guide serves as a guide to the determined timing.

3. A game machine according to claim 2, wherein the changing determines, as the timing to newly execute game operation, a time that follows a time represented by the stored timing data by a given period of time.

4. A game machine according to any one of claims 1 to 3, wherein:
    the stored timing data stored represents multiple kinds of timing to execute the game operation;
    the displaying the timing guide image displays multiple timing guide images each of which is associated with the multiple kinds of timing represented by the stored timing data so that the timing guide images gradually approach the timing instruction image; and
    when the evaluating makes an evaluation about the special timing guide for one of the multiple kinds of timing to execute the game operation and the evaluation yields a given result, the changing moves the special timing guide toward the normal timing guide to execute the game operation, and guidance for the another timing is withheld from the player.

5. A game control method, which allows a player to execute a game operation using a controller in time with game music, comprising:
    obtaining timing of game operation executed using the controller;
    displaying, on a display screen, a timing instruction image in order to give guidance to the player about when to execute the game operation;
    displaying, on the display screen, a timing guide image, said timing guide image including a normal timing guide and a special timing guide for said player, to guide the player about when to execute the game operation, the special timing guide being created based on timing data which is stored in timing data storage, the timing data indicating a time when game operation should be executed using the controller, the special timing guide gradually approaching the timing instruction images;
    evaluating a game operation that is executed by the player by comparing the timing of the game operation timing that is obtained in the obtaining with timing that is represented by the timing data stored in the timing data storage, which the special timing guide is created from, to generate a time gap; and
    changing a display position trajectory of the special timing guide on the display screen depending on a result of the evaluation when the time gap is smaller than a given amount, so as to inform said player of said evaluating each time the game operation is executed,
    wherein when the evaluation result is less than a predetermined time, the display position trajectory of the special timing guide is changed, so that the special timing guide turns from an initial trajectory having an initial direction to a special trajectory having a different direction from the initial direction , to collide with the normal timing guide and to cause the normal timing guide to disappear, and the player is no longer required to execute the game operation indicated by the normal timing guide.

6. A non-transitory computer-readable information storage medium, which stores a program which causes a computer to function as a game machine which allows a player to execute a game operation using a controller in time with game music, the program causing the computer to function as:
    means for obtaining timing of the game operation executed using the controller;
    means for storing timing data, the timing data indicating when to execute the game operation using the controller;
    means for displaying, on a display screen, a timing instruction image to guide the player about when to execute the game operation;
    means for displaying, on the display screen, a timing guide image, said timing guide image including a normal timing guide and a special timing guide for said player, to guide the player about when to execute the game operation, the special timing guide being created based on the stored timing data, the special timing guide gradually approaching the timing instruction image, wherein said special timing guide has an appearance that is substantially different form said normal timing guide;
    means for evaluating the game operation executed by the player by comparing the timing of the obtaining game operation with timing that is represented by the stored timing data that the special timing guide is created from, to generate a time gap; and means for changing a display position trajectory of the special timing guide on the display screen depending on a result of the evaluation when the time gap is smaller than a given amount, so as to inform said player of said evaluating each time the game operation is executed, wherein when the evaluation result is less than a predetermined time, the display position trajectory of the special timing guide is changed, so that the special timing guide turns from an initial trajectory having an initial direction to a special trajectory having a different direction from the initial direction , to collide with the normal timing guide and to cause the normal timing guide to disappear, and the player is no longer required to execute the game operation indicated by the normal timing guide.

7. The game machine of claim 1, wherein the normal timing guide moves upward on the screen toward the timing instruction image, and overlaps with the timing instruction image, and then continues to move upward and disappear off the screen, and the special timing guide changes said trajectory display position depending on the result of the evaluation.

8. The game machine of claim 1, wherein the special timing guide follows (a) a normal trajectory after said player has executed said game operation if the evaluation result is between a first level indicative of the first time and a second level indicative of the second time, (b) a pre-shift special timing trajectory if the evaluation result is below said first level, and (c) a post-shift special timing trajectory if the evaluation result is above said second level.

9. The game machine of claim 8, wherein said first level and said second level correspond to respective time gaps between a supposed execution and said execution by said player.

10. The game machine of claim 8, wherein said pre-shift special timing comprises upward movement, said post-shift special timing trajectory comprises downward movement, and said normal trajectory comprises movement other than said upward movement and said downward movement.

11. The game machine of claim 10, wherein said downward movement comprises said special timing guide moving downward to collide with said normal timing guide, at which point said special timing guide and said normal timing guide jump away from each other and then disappear.

12. The game machine of claim 1, wherein said stored timing data comprises a first value indicative of a player not executing said game operation, and second, third and fourth values indicative of a player executing said game operation.

13. The game machine of claim 12, wherein said second value is indicative of said player performing said execution in a normal time, said third value is indicative of a pre-shift special timing, and said fourth value is indicative of a post-shift special timing.

14. The game machine of claim 1, wherein said player comprises one single player.

* * * * *